United States Patent [19]
Marx

[11] 3,749,171

[45] July 31, 1973

[54] DECREASING THE PERMEABILITY OF SUBTERRANEAN FORMATIONS

[75] Inventor: John W. Marx, Bartlesville, Okla.

[73] Assignee: Phillips Petroleum Company, Bartlesville, Okla.

[22] Filed: Feb. 17, 1971

[21] Appl. No.: 116,217

[52] U.S. Cl.................. 166/274, 166/294, 106/213
[51] Int. Cl...................... E21b 33/13, E21b 43/16
[58] Field of Search.................... 166/274, 275, 284, 166/285, 283, 246; 106/213

[56] References Cited
UNITED STATES PATENTS

| | | | |
|---|---|---|---|
| 3,251,414 | 5/1966 | Willman | 166/294 X |
| 3,611,733 | 10/1971 | Eilers | 166/294 X |
| 3,336,977 | 8/1967 | Amott | 166/274 |
| 3,486,559 | 12/1969 | Flickinger | 166/275 X |
| 3,305,016 | 2/1967 | Lindbloom | 166/246 |
| 3,326,287 | 6/1967 | Corrin | 166/274 X |

*Primary Examiner*—Robert L. Wolfe
*Attorney*—Young and Quigg

[57] ABSTRACT

A method for selectively decreasing the permeability of a subterranean formation of nonuniform permeability wherein there is injected into said formation a suspension of finely divided particles or granules of a permeability reducing agent. The largest particle or granule in said suspension has a particle size which is larger than the median pore size but significantly smaller than the largest pore size in said formation.

23 Claims, No Drawings

DECREASING THE PERMEABILITY OF SUBTERRANEAN FORMATIONS

This invention relates to selectively decreasing the permeability of a subterranean formation.

The secondary recovery of oil from oil-bearing or containing subterranean formations by fluid drive processes wherein a fluid is injected into the formation via an injection well to drive the oil through the formation to a production well is a well known process. Fluids used in such processes include liquids, such as water and various hydrocarbons, and gases such as hydrocarbon gases, carbon dioxide, etc. Many oil reservoirs consist of layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances such channeling results in leaving substantial quantities of oil in the less permeable zones of the formation which are bypassed.

Various methods have been proposed as solutions for this problem, for example, methods of mobility control wherein the driving liquid is thickened by the addition of various agents thereto. It has also been proposed to mechanically pack or choke off the high permeability zones of the formation, once they have been flooded out. However, as a practical matter, this is difficult to accomplish. Various plugging agents have also been proposed in selective plugging processes for selectively plugging the high permeability zone. However, for one or more reasons all of the above methods have been found lacking and not feasible in many instances.

The present invention provides a solution to the above-described problems. I have now discovered that by controlling the particle size of the permeability decreasing or plugging agents which are injected into the formation, the efficiency of a fluid drive process can be markedly increased. I have discovered that it is the size of the largest particle, not the size of the median particle, which determines the ability of the permeability decreasing or plugging agent suspension to discriminate between the low permeability and the high permeability zones of a formation. Thus, broadly speaking, in the present invention the particle size of the permeability decreasing or plugging agent is tailored to conform to the pore sizes of the formation into which the drive fluid is injected. Preferably, the largest particle in the suspension of permeability decreasing agent will have a size which is larger than the median pore size of the relatively high permeability zone(s) of the formation but substantially smaller than the largest pore size in said zone(s).

Thus, in accordance with the invention, there is provided a process for selectively decreasing the permeability of a porous subterranean formation of nonuniform permeability, which process comprises: injecting into said formation a suspension of finely divided particles or granules of a permeability reducing agent in an essentially inert carrier liquid, and wherein the largest particle or granule has a size which is larger than the median pore size but significantly smaller than the largest pore size in said formation.

It is the largest particle size, not the median particle size, which determines whether a particle system can penetrate a given zone of a formation. If the size of the largest particles in the suspension approaches or exceeds the size of the largest pores in said zone, the entire suspension will tend to filter out at the entry face, with little or no penetration into the bulk porous matrix of the zone. On the other hand, in the absence of significant absorption properties, if the largest particle size is significantly smaller than the median pore size of said zone, the entire suspension may pass through the zone with little or no permeability reduction. In order to decrease the permeability of, or plug off, driving fluid thief zone(s) in a formation, it is necessary to combine good penetration with large permeability reduction. In the practice of the invention, this is accomplished by employing a suspension of permeability decreasing agent wherein the size of the largest particle is larger than the median pore size, but is significantly smaller than the size of the largest pores of the high permeability zone(s) of the formation. As the suspension moves through the formation at least some of the larger particles are deposited at pore constrictions. Preferably, and useful over a wide variety of formations, good permeability decreasing results or plugging results are obtained when the size of the largest particle is within the range of from 1.1 to 2.5, preferably from 1.5 to 2 times the median pore size of said high permeability zones. Preferably, at least about 50 percent of the particles in the suspension will have a size within said ranges. It is also preferred that said largest particles have a size which is within the range of from 5 to 40, more preferably 10 to 25, percent smaller than the largest pore in the formation being treated.

The median pore size is defined as the midpoint of a standard pore size distribution curve. Such a distribution curve is most conveniently obtained by using a mercury porosimeter on a representative core sample or samples from the formation or zone of interest. The above definition of median pore size means that half of the formation or zone porosity is represented by pores larger than said median pore size and half of the formation or zone porosity is represented by pores smaller than said median pore size. When pore size distribution data are not available, the median pore size can be approximated with acceptable accuracy from conventional permeability and porosity data by means of the equation $$\bar{d}_p = 5.62 \; \sqrt{(k_o/\phi)}$$

where $\bar{d}_p$ is the median pore diameter in microns, $k_o$ is the initial specific brine permeability in darcys, and $\phi$ is the fractional porosity.

Generally speaking, for any reservoir or formation situation in which permeability differences between high permeability zones and low permeability zones are great enough to create problems in fluid drive processes, it will usually be found that the median pore sizes for the higher permeability zones will be at least two or more times greater than the median pore sizes for the lower permeability zones. Thus, for example, a condition wherein the size of the largest particle in the injected suspension is within the range of about 1.5 to about 2 times the median pore size of the higher permeability zones will correspond to a condition wherein the size of the largest particle is at least 2 times the median pore size of the lower permeability zones. Relative conditions for said particle sizes and said median pore sizes in this order of magnitude will provide the desired discrimination between said higher permeability zones and said lower permeability zones, e.g., major indepth penetration and at least partial plugging of the higher permeability zones with little or no penetration and/or in-depth plugging of the lower permeability zones.

The above description of particle sizes and median pore sizes, or theory of operation of the invention, is given for purposes of guidance only and is not intended to be limiting on the invention. It will be understood by those skilled in the art that reservoir or formation conditions can vary widely. Thus, it is within the scope of the invention to employ susensions of permeability descreasing agents wherein the relationship between the size of the largest particles in the suspension and the median pore sizes of said high and low permeability zones is outside said ranges. It will also be understood that the terms "high permeability zone" and "low permeability zone" must necessarily be relative to each other for a given formation. For example, what would be a low permeability zone in one formation could be high permeability zone in another formation, numerically speaking, and vice versa. For this reason said terms cannot be precisely defined in terms of numerical limits.

The invention is applicable to the use of any permeability decreasing agent which can be obtained, or prepared, in the desired particle size range. The particles of said agents can be mechanically classified as to size, as by screening, or can be altered or obtained in the desired size range during the preparation thereof. Examples of suitable permeability decreasing or plugging agents which can be used in the practice of the invention include, among others, latex, various plastics such as polyethylene and polypropylene, asphalt, clays such as bentonite, and starches. The starches are the presently more preferred agents for use in the practice of the invention because of cost, ready availability, ease of handling in the preparation of the suspension, etc. For reasons set forth below, rice starch is the presently most preferred agent for use in the practice of the invention.

The carrier liquid used in the suspensions of the invention can be any liquid which is compatible with the permeability decreasing or plugging agent being used. Examples of such carrier liquids are water, various brines, and hydrocarbon liquids. Water and brine are usually the preferred carrier liquids.

In most instances the particle size of the permeability decreasing or plugging agent will be in the range of from about 3 to about 50 microns, preferably 5 to about 32 microns, depending upon the pore sizes in the formation being treated. However, it is within the scope of the invention to use particles having sizes outside the above ranges, again depending upon the pore sizes of the formation.

The suspensions used in the practice of the invention can contain from 0.02 to 1, preferably 0.05 to 5 weight per cent of the plugging agent or permeability decreasing agent. However, it is within the scope of the invention for said suspensions to contain amounts of agents outside the above ranges. If desired or necessary, it is within the scope of the invention to include a stabilizing agent in said suspensions to maintain the particles in suspension after preparation and during injection. Any suitable stabilizing agent known to the art can be employed. Examples of suitable stabilizing agents include, among others, the following: nonionic agents such as Igepal CO-970, available from GAF Corp.; cationic agents such as Ethomeen C-20, available from Armour Industrial Chemical Co.; and anionic agents such as Tanol SN, available from Rohm and Hass Co.

The invention is applicable to decreasing the permeability in formations prior to or during secondary recovery operations such as fluid drive processes, and also for water shutoff treatments in producing wells. In fluid drive secondary recovery processes the formation is usually penetrated by at least one injection well and at least one production well. It should be understood, however, that this invention can be employed where a plurality of injection wells and/or a plurality of production wells are utilized.

In one embodiment of the invention a conventional waterflood or gas drive is carried out in conventional manner until the drive fluid breaks through into the production well in excessive amounts. A suspension of permeability decreasing or plugging agent is then pumped down the well and injected into the formation in any suitable manner, any suitable amount, and for any desired period of time sufficient to obtain the desired in-depth penetration and decrease in permeability or plugging of the high permeability zones of the formation. Usually an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.05 to 0.5 pore volumes of a suspension in accordance with the invention over a 1- to 6-month period of time. Or, the injection of the suspension can be carried out by injecting a slug of about 200 to 5,000 barrels of suspension into the well and then into the formation. After completing injection of the suspension, it may be necessary to remove the filter cake of plugging agent or permeability decreasing agent which deposits on the face of the low permeability zones. This can be accomplished in any suitable manner. For example, a brief backflushing of the well immediately after the suspension injection can be employed. In other instances, the well bore can be washed with concentrated acid or alkali solution to solubilize the agent at the formation surface. Alternatively, with some agents, the agent can be solubilized by flushing the well bore with high temperature steam to heat the immediate formation face to a temperature sufficient to solubilize said agent. Another alternative is to employ shallow selective reperforation of the low permeability zones. Any of these techniques will eliminate the shallow coating on the face of the low permeability zones without materially affecting the in-depth deposition of the permeability decreasing or plugging agent in the high permeability thief zones of the formation.

In another embodiment of the invention, the formation can be treated prior to carrying out the fluid drive secondary recovery operations. This embodiment is particularly applicable where there is a good knowledge of the nature of the formation. Thus, in a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. Such a condition can exist where there is a water sand adjacent the hydrocarbon-bearing sand and the water intrudes into the bore hole and interferes with the production of hydrocarbon. In such instances the formation can be treated in accordance with the invention to shut off the flow of water. The method of carrying out such a water shutoff treatment is substantially the same as described above in connection with fluid drive operations.

It is also within the scope of the invention to carry out the permeability control techniques of the invention periodically or intermittently, as needed, during the course of a fluid drive secondary recovery operation, or during the production of oil from a producing well.

In all of the above operations the injection of the suspension of permeability decreasing or plugging agent can be carried out in conventional manner. If desired, selected portions of the formation can be isolated mechanically, as by the use of packers, and other means known to the art, for treatment in accordance with the invention.

As indicated above, the various starches are the preferred permeability decreasing or plugging agents for use in the practice of the invention. Typical size distributions for various commercially available starches are set forth in Table I below.

TABLE I

Typical Size Distributions for Dry Commercial Starches as Received

| Starch Type | Average Particle (microns) | Particle Size Range (microns) |
|---|---|---|
| Rice | 4.5 | 3 – 6 |
| Corn | 15 | 5 – 32 |
| Wheat | 10 | 2 – 35 |
| Tapioca | 20 | 5 – 35 |
| Sago | 40 | 20 – 60 |
| Arrowroot | 35 | 15 – 70 |
| Barley | 20 | 2 – 35 |
| Potato | 50 | 15 – 100 |

It will be noted that some of the natural starches contained particles which are outside the above-described preferred ranges. In such instances, the large size fractions can be removed by mechanical screening. However, this increases cost of the process and, in general, is not preferred. It is more preferred to select or prepare a starch having a desired particle size. Mixtures of starches having desired particle sizes in accordance with the invention can also be used.

The presently most preferred starch for use in the practice of the invention is a preswelled starch which has been swelled to a predetermined size by heating in an aqueous medium, preferably a brine, at a temperature and for a period of time sufficient to obtain the desired degree of swelling. In this manner, the particle size distribution of the starch suspension can be controlled within close practical limits. Rice starch is the preferred starting material for preparing suspensions in accordance with the invention because it has the smallest average particle size (typically about 4.5 microns) and the most narrow size distribution range (typically 3 to 6 microns) of any natural starch. When starting with these small essentially uniform particles, an operator can accommodate a wide variety of permeability situations or differences by control of the swelling conditions. This would not be the situation with other natural starches which have initial particle size ranges extending above about 30 microns (see Table I above) which, in general, are too large for use in the majority of reservoir situations. When natural starches other than rice starch are used as the starting material in preparing the preswelled starches which are preferred for use in the practice of the invention, it will usually be necessary to remove the larger size fractions prior to carrying out the swelling operation. This can be done but is not preferred because it adds to costs of the process. However, it should be specifically noted that the invention is not restricted to the use of rice starch even though it is highly preferred.

The preswelling of the starch granules and their subsequent injection as aqueous suspension into subterranean formations in accordance with the brines. However, brines having a total salinity of at least 5, preferably at least 8, weight percent sodium chloride, or equivalent, are much more desirable than fresh water or weaker brines. Calcium chloride, magnesium chloride, potassium chloride, as well as the other alkali metal chlorides, and other salts usually found in oil field brines, are equivalent to sodium chloride in computing total salinity. The stronger brines are preferred because they prevent biodegradation of the starch and produce a slower and more uniform swelling which leads to a better terminal particle size control. If fresh water or brines of less than 5 weight percent total salinity are used, it may be necessary to add a bactericide, such as from 500 to 5,000 parts per million of formaldehyde or chloroform, to the suspension to prevent biodegradation of the starch. The use of such bactericides is not preferred because it increases costs and may introduce problems as to the stability of the bactericide in prolonged contact with oil reservoir components. Consequently, it is preferred that the reservoir applications be based upon the use of strong brines, and that the preswelling operations be carried out in a brine of the same general salinity as the injection brine. Frequently, such strong brines are available as produced water in advanced waterflood operations.

One presently preferred method for preswelling starch granules and preparing starch suspensions for use in accordance with the invention is as follows: A suspension of starch granules in brine (preferably having a total salinity greater than 5 weight percent) is heated for a period of time within the range of 1 to 10, preferably 2 to 6 hours, at a temperature which is predetermined by the desired terminal particle size. Said temperature can be within the range of from about 50 to about 95, preferably about 65 to about 95, °C., as set forth in Table II below, and depending upon the type of starch being used. Within the above-stated time interval, the ultimate size of the swelling starch particles is determined primarily by the temperature and secondarily by the brine salinity. Vigorous agitation is preferred at the outset so as to disperse the starch granules and break up any aggregates thereof, and continuous mild agitation is preferred during the swelling procedure so as to prevent any settling which may occur after the particles or granules are dispersed. Any convenient starch concentration can be used in this swelling process. Preferably, the initial starch concentration will range from about 1 to about 10, more preferably from about 2 to about 5, weight precent. Microscopic examination of samples taken periodically during the swelling process can be relied upon for accurate terminal size determination. When the desired terminal particle size is reached, the heating can be stopped and the swollen particle concentrate is ready for dilution, preferably with concentrated brine as described above, down to the concentrations used in the injection suspension. Normally, the concentration of the swollen starch particles or granules used for injection will be within the range of from 0.02 to 1, preferably 0.05 to 0.5, weight percent. However, concentrations outside these ranges can be employed in unusual situations.

From the data set forth in Table III above it is evident that a properly sized preswollen starch particle suspension can invert the permeability ratio between high and low permeability strata in a subterranean formation. It is also evident that with longer passageways, such as would exist in an actual formation, the injection could be continued to essentially complete plugging of the high permeability zone, if desired.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

TABLE II

[Terminal rice starch particle size vs. soaking temperature]

| NaCl content, weight percent | Initial particles (microns) | Terminal particle size after soaking (microns) ° C. | | | | | | |
|---|---|---|---|---|---|---|---|---|
| | | 65 | 70 | 75 | 80 | 85 | 90 | *95 |
| 5 | 3-6 | 7-8 | 8-10 | 10-12 | 12-15 | 15-20 | 20-25 | 25-30 |
| 10 | 3-6 | 6 | 7-8 | 8-10 | 10-12 | 12-15 | 15-20 | 20-25 |

* At 95° C. and to a lesser extent at somewhat lower temperatures, there was some conversion of starch to soluble starch, with corresponding loss of some of the discrete particles. However, an adequate number of particles did survive to function within the concept of this invention.

The following example will serve to further illustrate the invention.

EXAMPLE

Core samples were selected from two zones in the Burbank sand reservoir, Osage County, Okla. Sample No. 1 had a permeability of 1,250 millidarcys and a median pore size of 17 microns. Sample No. 2 had a permeability of 41 millidarcys and a median pore size of 3.5 microns. A rice starch suspension wherein more than 50 percent of the particles had a terminal particle size (largest particle size) of about 28 microns was prepared by soaking rice starch in an 8.8 weight percent sodium chloride solution for 6 hours at a temperature of 85° to 95° C. The initial starch concentration was approximately 2 weight percent. The 8.8 weight percent sodium chloride solution was used to simulate actual Burbank field brine which has a total salinity of this magnitude. The swollen starch concentrate was then diluted with 8.8 weight percent NaCl solution. The resulting suspension at a concentration of 0.1 weight percent, or 1,000 ppm, was injected into both of said core samples.

In Sample No. 1 the starch dispersion penetrated the entire length, 2.5 inches, and uniformly reduced the permeability thereof from 1,250 millidarcys to 7 millidarcys with no evidence of filter caking at the entry face.

In Sample No. 2 the starch suspension was almost entirely concentrated at the entry face, with very little penetration of the porous matrix, and the permeability was reduced only from 41 millidarcys to 36 millidarcys. Data for the two runs are set forth in Table III below.

TABLE III

| Sample No. | Starch $d_a$ ($\mu$) | Pores $d_p$ ($\mu$) | $d_a/d_p$ | Matrix Permeability (md) Initial | After Starch Flood |
|---|---|---|---|---|---|
| 1 | 28 | 17 | 1.65 | 1250 | 7 |
| 2 | 28 | 3.5 | 8.0 | 41 | 36 |
| Ratio #1/#2 | → | → | → | 30 | 0.2 |

I claim:

1. A process for selectively decreasing the permeability of a porous subterranean formation of vary pore size and nonuniform permeability, which process comprises:
    injecting into said formation a suspension of finely divided particles or granules of a permeability reducing agent in an essentially inert carrier liquid, and wherein the largest particle or granule in said suspension has a size which is larger than the median pore size but significantly smaller than the largest pore size in said formation.

2. A process according to claim 1 wherein said formation has at least one zone of relatively high permeability and at least one zone of relatively low permeability and the largest particle or granule in said suspension has a size which is larger than the median pore size but significantly smaller than the largest pore size in said high permeability zone.

3. A process according to claim 2 wherein the largest particles in said suspension have sizes within the range of from 1.1 to 2.5 times said median pore size.

4. A process according to claim 2 wherein said formation is a hydrocarbon-bearing formation and is penetrated by at least one well.

5. A process according to claim 1 wherein: said formation is a hydrocarbon-bearing formation; said carrier liquid is water; and said permeability reducing agent is starch.

6. A process according to claim 5 wherein said carrier liquid is a brine.

7. A process according to claim 5 wherein said starch is rice starch.

8. A process according to claim 5 wherein said starch is rice starch and said carrier liquid is a brine having a total salinity of at least 5 weight percent.

9. A process according to claim 4 wherein:
    said at least one well is an injection well;

said formation is an oil-bearing formation and is also penetrated by at least one production well;

said suspension is introduced into said injection well and into said formation prior to injecting a fluid into said formation in a fluid drive process for the recovery of said oil from said formation.

10. A process according to claim 4 wherein:

said at least one well is a hydrocarbon-producing well;

said formation includes a water-bearing stratum having a permeability greater than the permeability of the hydrocarbon-bearing stratum and water from said water-bearing stratum interferes with production of hydrocarbons from said hydrocarbon-bearing formation; and said suspension is introduced into said well and into said water-bearing stratum.

11. A process according to claim 4 wherein:

said at least one well is an injection well;

said formation is an oil-bearing formation and is also penetrated by at least one production well;

said suspension is introduced into said injection well and into said formation subsequent to having injected a fluid into said injection well and into said formation in a fluid drive process for driving said oil to said production well.

12. A secondary recovery process for recovering oil from a porous subterranean formation of nonuniform permeability which is penetrated by at least one injection well and at least one production well, and which includes at least one stratum of relatively high permeability and at least one stratum of relatively low permeability, which process comprises:

injecting a fluid flooding agent via said injection well into said formation to displace oil preferentially from said stratum of relatively high permeability into said production well;

thereafter injecting into said formation via said injection well a suspension of finely divided particles or granules of a permeability reducing agent wherein the largest particle or granule has a size which is larger than the median pore size but significantly smaller than the largest pore size in said stratum of relatively high permeability, said suspension being injected in an amount and for a period of time sufficient to penetrate said high permeability stratum to a significant distance out from said well so as to at least partially plug and significantly reduce the permeability of said high permeability stratum, but insufficient to effect more than a shallow face plugging of said low permeability stratum;

terminating injection of said suspension;

removing said shallow face plugging from said low permeability stratum; and thereafter resuming injection of said fluid flooding agent into said formation to displace oil preferentially from said low permeability stratum.

13. A process according to claim 12 wherein:

said carrier liquid in said suspension is water; and said permeability reducing agent is starch.

14. A process according to claim 13 wherein said starch is a rice starch which has been preswelled by soaking in an aqueous medium at a temperature and for a period of time sufficient to swell the granules thereof to the desired size prior to use in said suspension.

15. A process according to claim 14 wherein said rice starch has a granule or particle size within the range of from 5 to 32 microns, and the largest granules or particles have sizes within the range of from 1.5 to 2 times said median pore size.

16. A process according to claim 15 wherein said suspension contains from 0.02 to 1 weight percent of said starch particles.

17. A method for preparing a composition for reducing the permeability of a porous formation, which method comprises:

heating starch granules or particles in an aqueous medium at a temperature and for a period of time sufficient to swell said granules to a predetermined size range wherein the largest granule or particle has a size which is larger than the median pore size of said formation but significantly smaller than the largest pore size in said formation; and diluting the resulting suspension to a concentration suitable for injection into said formation.

18. A method according to claim 17 wherein said starch is rice starch and is heated at a temperature within the range of from 65° to 95° C. for a period of time within the range of from 1 to 10 hours to produce granules or particles having a size within the range of from 5 to 32 microns.

19. A method according to claim 18 wherein the largest granule or particle has a size within the range of from 1.1 to 2.5 times said median pore size and said diluted suspension contains from 0.02 to 1 weight percent of starch.

20. A process according to claim 2 wherein:

said formation is an oil-bearing formation and is penetrated by at least one injection well and at least one production well; and said suspension is introduced into said injection well and into said zone of relatively high permeability subsequent to having injected a drive fluid into said injection well and into said formation in a fluid drive process for driving said oil to said production well.

21. A process according to claim 20 wherein:

the size of the largest particles in said suspension is within the range of from 1.1 to 2.5 times the median pore size of said high permeability zone;

about 50 percent of the particles in said suspension have a size within said range; and said largest particles have a size which is within the range of from about 5 to about 40 percent smaller than the largest pore in said high permeability zone.

22. A process according to claim 21 wherein said carrier liquid comprises water and said permeability reducing agent is a starch.

23. A process according to claim 22 wherein said carrier liquid is a brine having a total salinity of at least 5 weight percent and said starch is rice starch.

* * * * *

UNITED STATES PATENT OFFICE
CERTIFICATE OF CORRECTION

Patent No. 3,749,171　　　　　　　　Dated July 24, 1973

Inventor(s) John W. Marx

It is certified that error appears in the above-identified patent and that said Letters Patent are hereby corrected as shown below:

Col. 8, Claim 1, line 31, delete "vary pore size" and insert --varying pore size--.

Signed and sealed this 1st day of January 1974.

(SEAL)
Attest:

EDWARD M. FLETCHER, JR.　　　　　RENE D. TEGTMEYER
Attesting Officer　　　　　　　　　Acting Commissioner of Patents